United States Patent
Modi et al.

(10) Patent No.: US 7,663,696 B2
(45) Date of Patent: Feb. 16, 2010

(54) DIGITAL/ANALOG CLOSED CAPTION DISPLAY SYSTEM IN A TELEVISION SIGNAL RECEIVER

(75) Inventors: Khelan M. Modi, Fishers, IN (US); Joseph Wayne Forter, Zionsville, IN (US); Charu Aneja, Chicago, IL (US); Aaron Hal Dinwiddie, Cicero, IN (US)

(73) Assignee: Thomson Licensing, Boulogne Billancourt (FR)

( * ) Notice: Subject to any disclaimer, the term of this patent is extended or adjusted under 35 U.S.C. 154(b) by 362 days.

(21) Appl. No.: 10/581,152

(22) PCT Filed: Dec. 8, 2004

(86) PCT No.: PCT/US2004/041086
§ 371 (c)(1),
(2), (4) Date: May 31, 2006

(87) PCT Pub. No.: WO2005/057920
PCT Pub. Date: Jun. 23, 2005

(65) Prior Publication Data
US 2007/0076122 A1 Apr. 5, 2007

Related U.S. Application Data

(60) Provisional application No. 60/527,945, filed on Dec. 8, 2003.

(51) Int. Cl.
*H04N 7/00* (2006.01)
*H04N 11/00* (2006.01)
(52) U.S. Cl. .................................. 348/468; 348/465
(58) Field of Classification Search .............. 348/468, 348/461, 462, 463, 563–564, 589, 553–558
See application file for complete search history.

(56) References Cited

U.S. PATENT DOCUMENTS 6,373,526 B1 * 4/2002 Kessler et al. ............... 348/468

(Continued)

FOREIGN PATENT DOCUMENTS

WO 00/57642 A 9/2000

(Continued)

OTHER PUBLICATIONS

European Search Report dated Mar. 29, 2005.

*Primary Examiner*—Michael Lee
(74) *Attorney, Agent, or Firm*—Robert D. Shedd; Joseph J. Opalach; Brian J. Cromarty

(57) ABSTRACT

A digital television signal receiver (20) processes a digital television signal and auxiliary information contained in the digital television signal regardless of whether the auxiliary information is analog auxiliary information (36) or digital auxiliary information (34) and produces a television display signal (44) suitable for displaying the processed auxiliary information. In the case of the auxiliary information being closed caption information, the digital television signal receiver extracts and processes digital closed captioning information according to standard EIA-708 or extracts and processes analog closed caption information according to standard EIA-608. The television signal processing receiver thus allows the user the option of selecting a fallback method of obtaining captioning for a digital program signal if the digital program signal does not include digital closed captioning. Thus, if a digital television signal does not include digital closed caption information, the digital television signal receiver automatically processes any analog auxiliary information and provides a television signal having closed caption information suitable for display.

17 Claims, 3 Drawing Sheets

U.S. PATENT DOCUMENTS

| | | | |
|---|---|---|---|
| 6,507,369 B1 * | 1/2003 | Kim | 348/465 |
| 7,019,787 B2 * | 3/2006 | Park | 348/468 |
| 2002/0122136 A1 | 9/2002 | Safadi et al. | |

FOREIGN PATENT DOCUMENTS

| | | |
|---|---|---|
| WO | WO 2005/057920 | 6/2005 |

\* cited by examiner

DIGITAL/ANALOG CLOSED CAPTION DISPLAY SYSTEM IN A TELEVISION SIGNAL RECEIVER

This application claims the benefit, under 35 U.S.C. § 365 of International Application PCT/US2004/041086 filed Dec. 8, 2004, which was published in accordance with PCT Article 21(2) on 23 Jun. 2005 in English and which claims the benefit of U.S. provisional patent application No. 60/527,945 filed Dec. 8, 2003.

BACKGROUND

1. Field of the Invention

The present invention relates to television signal processing and, more particularly, to processing of auxiliary data contained in a digital television signal.

2. Background Information

Most television signal processing systems in the United States provide for the processing of auxiliary information such as closed caption (CC) data that is carried in analog television signals (e.g. NTSC). Auxiliary information such as closed caption data follows EIA-608 which establishes the standard for providing auxiliary data in analog television signals. Analog television signal processing systems extract the closed caption data from the analog television signal and generate a signal suitable for displaying the closed caption information. Other forms of auxiliary information also exist. For example, Extended Data Services (XDS) information may be included in an analog television signal for providing information such as program content rating data, program title, program duration, etc.

With respect to digital television signals (e.g. ATSC), EIA-708 establishes the standard for providing auxiliary data such as closed caption (CC) data and XDS data in digital television signals. However, with the transition from analog programming (i.e. analog television signals) to digital programming (i.e. digital television signals), television signal service providers cannot always provide digital closed caption data in the digital programming. Because of this, television signal providers may transfer the analog closed caption data to the digital programming. To support this transfer of analog closed caption data on digital programming, digital television signal service providers simply embed the analog closed caption data into the digital television program stream with specific headers. Since EIA-708B describes how to detect embedded EIA-608 closed caption data in a digital television stream, it is possible to detect and display analog closed caption data (i.e. EIA-608 CC data) from the digital television stream.

Some televisions provide a user with an option to select either digital or analog captioning for display. If the user selects analog captioning and no analog captioning is available, the television will not display any closed caption. As well, if the user selects digital captioning and no digital captioning is available, the television will not display any closed captioning. Currently, however, there is no manner of always displaying closed caption data for a digital television channel regardless of whether the closed caption data is in analog or digital form.

It is thus evident from the above discussion that what is needed is a television signal processing system for digital television signals that detects whether digital or analog auxiliary data is available in the digital television signal and then processes for display whichever auxiliary data format is available.

These needs and others are accomplished through application of the principles of the subject invention and/or as embodied in one or more various forms and/or structures such as are shown and/or described herein.

SUMMARY

A television signal receiver provides processing of a digital television signal including the processing of digital auxiliary information or data when digital auxiliary data is present in the digital television signal or the processing of analog auxiliary information or data when analog auxiliary information is present in the digital television signal. The television signal receiver provides a resulting television signal that is suitable to display the processed auxiliary data or information.

In one form, there is provided a method of processing a digital television signal. The method includes the steps of: (a) receiving a digital television signal having closed caption data; (b) processing the closed caption data according to a digital closed caption data standard if it is determined that the closed caption data of the received digital television signal is in a digital closed caption standard format, else processing the closed caption data according to an analog closed caption data standard if it is determined that the closed caption data of the received digital television signal is in an analog closed caption standard format; and (c) providing a resulting television signal from the received digital television signal and the processed closed caption data that is suitable to show the processed closed caption data on a display.

In another form, the invention comprises a method of processing auxiliary information included in a television signal including the steps of receiving a digital television signal including auxiliary information, and processing the auxiliary information in accordance with a format of the auxiliary information and with a priority for processing the format of the auxiliary information. The method may include determining the format of the auxiliary information and selecting a priority for processing the format of the auxiliary information.

The selected priority may be such that the step of processing the auxiliary information occurs in response to determining that the auxiliary information comprises a digital auxiliary information format and selecting a priority for enabling processing of auxiliary information in a digital auxiliary information format and for disabling processing of auxiliary information in an analog auxiliary information format. Alternatively, the selected priority may comprise one of: a) a digital only priority for enabling processing of the auxiliary information only in response to determining that the format of the auxiliary information corresponds to a digital auxiliary information format, b) an analog only priority for enabling processing of the auxiliary information only in response to determining that the format of the auxiliary information corresponds to an analog auxiliary information format, and c) an any available priority for enabling the processing of the auxiliary information in either the digital or analog auxiliary information formats.

BRIEF DESCRIPTION OF THE DRAWINGS

In the drawings.

Corresponding reference characters tend to indicate corresponding parts throughout the several views.

DESCRIPTION OF THE PREFERRED EMBODIMENT(S)

Figure 1:
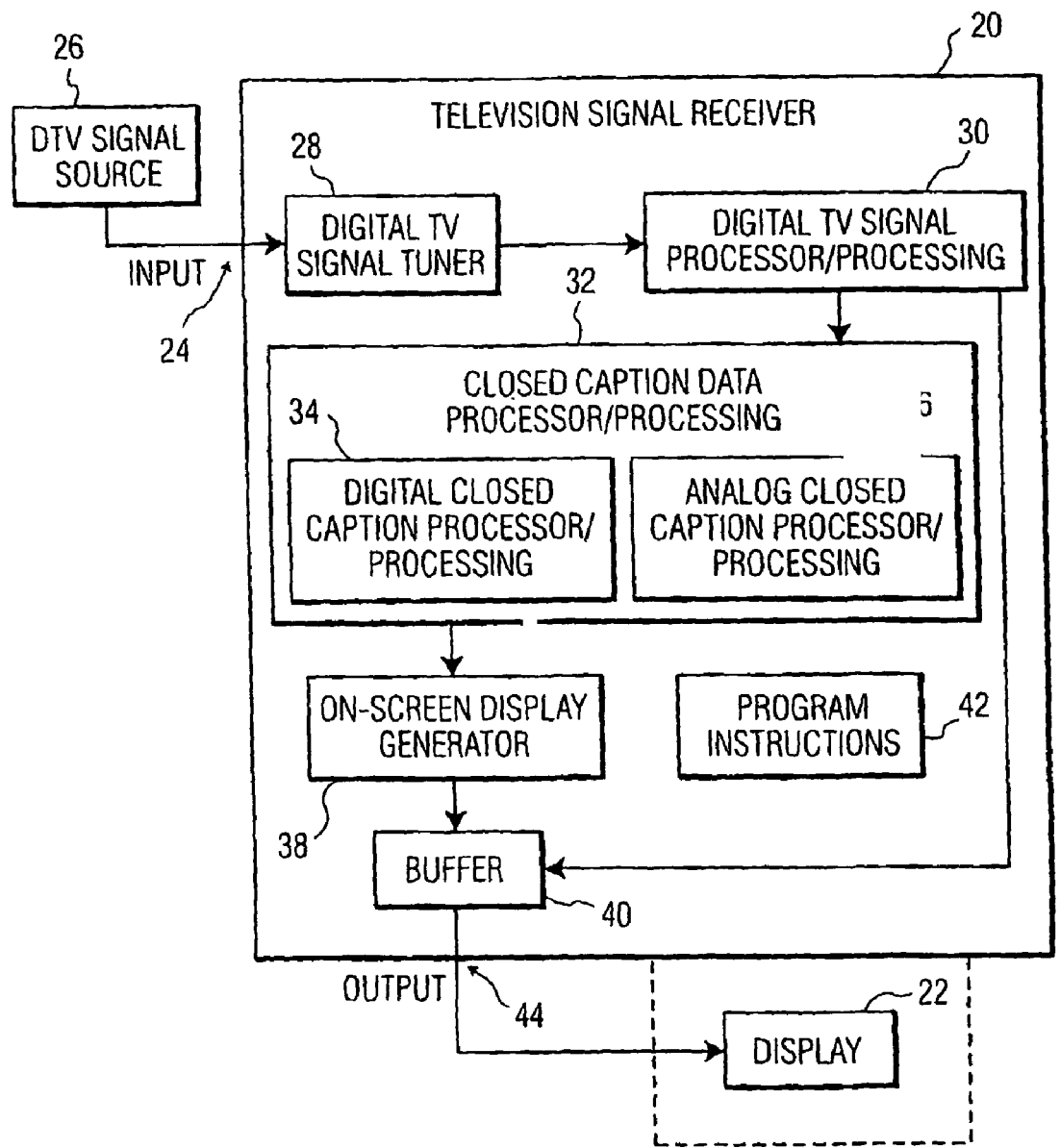
FIG. 1 is a block diagram view of an exemplary television signal processing apparatus in which the subject invention may be embodied.

Referring now to FIG. 1, there is depicted an exemplary representation of a television signal receiver generally designated 20 in which the subject invention may be embodied. The television signal receiver 20 is representative of various types of receivers and/or devices that receive and/or process digital television signals. Initially, it should be understood that while the television signal receiver 20 is described herein with respect to the processing of digital television signals and auxiliary data accompanying, contained or embedded in a received digital television signal, the television signal receiver 20 may receive and process analog television signals both with and without accompanying auxiliary data. Furthermore, the television signal receiver 20 is operable to receive and process digital television signals without accompanying auxiliary data. It should be appreciated that the television 20 also includes various television apparatus components that are not shown and/or described herein, but which are typical and/or necessary for a properly functioning television signal receiver.

The television signal receiver 20 has a digital television signal input 24 that is configured to receive digital television signals from a digital television signal source 26. The digital television signal input 24 may be any type of digital television signal input that is operable, configured and/or adapted to receive a digital television signal from a digital television signal source 26. The input 24 is connected to a digital television signal tuner 28. The digital television signal tuner 28 is operable, adapted and/or configured to receive the digital television signal and tune to a particular digital television signal, channel or frequency. Tuning of the digital tuner 28 is accomplished in a manner such as is known in the art. While it is typical that the digital television signal provided by the digital television source 26 contains multiple digital television channels, the term digital television signal, as used herein, encompasses one or more digital television channels.

The television signal receiver 20 also includes a digital television signal processor 30 that is operable, adapted and/or configured to process a digital television signal. As such, the digital signal processor 30 includes digital television signal circuitry/logic embodied as one or more integrated circuits and/or circuit elements. Moreover, the digital television signal processor 30 may utilize program instructions (e.g. software) 42 for some or all aspects of the signal processing. The digital television signal processor 30 is connected to an output of the digital television tuner 28 in order to receive the digital television signal selected (tuned) by the digital television signal tuner 28.

The digital television signal processor 30 is, among other features and/or functions, operable to assemble a video signal from the digital television signal that is received from the tuner 28. The resulting video signal is provided to a buffer 40 and is in a format that is displayable on a display 22. Moreover, the digital television signal processor 30 is operable to parse, extract and/or separate auxiliary data from the digital television signal. Particularly, the digital television signal processor 30 is operable to obtain auxiliary data in the form of closed caption data from the digital television signal. The obtained closed caption data (signal) is provided to a closed caption data processor 32.

The closed caption data processor 32 is operable, adapted and/or configured to process closed caption data that is received from the digital television signal processor 30. Such processing includes the detection of whether or not closed caption data is even received from the digital television signal processor 30 with regard to the television signal outputted by the digital television tuner 28, the processing of the closed caption data signal to obtain closed captioning, and the continuous monitoring of the closed caption data signal. As explained further below, continuous monitoring of the closed caption data signal is accomplished in order to switch the processing of the closed caption data signal with respect to a digital closed caption data format or standard and an analog closed caption data format or standard. The digital television signal processor 30 may, and preferably does, utilize program instructions 42 for some or all aspects of the closed caption data signal processing.

In accordance with the principles of the subject invention, the closed caption data processor 32 includes both a digital closed caption data processor 34 and an analog closed caption data processor 36. The digital closed caption data processor 34 is operable, adapted and/or configured to provide closed caption processing for closed caption data that is in a digital format (i.e. has digital closed caption packets), while the analog closed caption data processor 36 is operable, adapted and/or configured to provide closed caption processing for closed caption data that is in an analog format (i.e. has analog closed caption packets). The closed caption data processor 32 determines in which format the closed caption data has been received, and utilizes the appropriate one of the digital closed caption data processor 34 or the analog closed caption data processor 36 for appropriate processing. Thus, the closed caption data processor 32 is able to determine whether the closed caption data is in a digital format or in an analog format, and then process the closed caption data accordingly in order to provide a resulting closed caption signal.

The digital closed caption data processor 34 processes the digital closed caption data according to the digital closed caption standard or format that is currently embodied in standard EIA-708. The analog closed caption processor 36 processes the analog closed caption data according to the analog closed caption standard or format that is currently embodied in standard EIA-608. Of course, both processors 34, 36 may process the respective signals according to other standards or formats.

The output of the closed caption data processor 32 (a closed captioning signal or processed closed caption signal) is provided to the buffer 40. The buffer 40, or other component providing the same function, combines the video signal received from the digital television signal processor 30 with the closed captioning signal received from the closed caption. The resulting signal is then provided to the display 22 from which the display shows the video and closed captioning. It should be appreciated that the display 22 may or may not be integral with the television signal receiver 20 as represented by the dashed line surrounding the display 22.

The television signal receiver 20 is also operative to provide an on-screen user interface (UI) in the form of a menu having various user selectable options, choices or selections. This is accomplished via the on-screen generator 38 in conjunction with program instructions 42. The user menu provides access to features and/or functions of the television that are changeable or settable by the user some of which are typical and known in the art. However, in accordance with an aspect of the subject invention, one such feature is the selection of closed caption processing priority.

Figure 2:
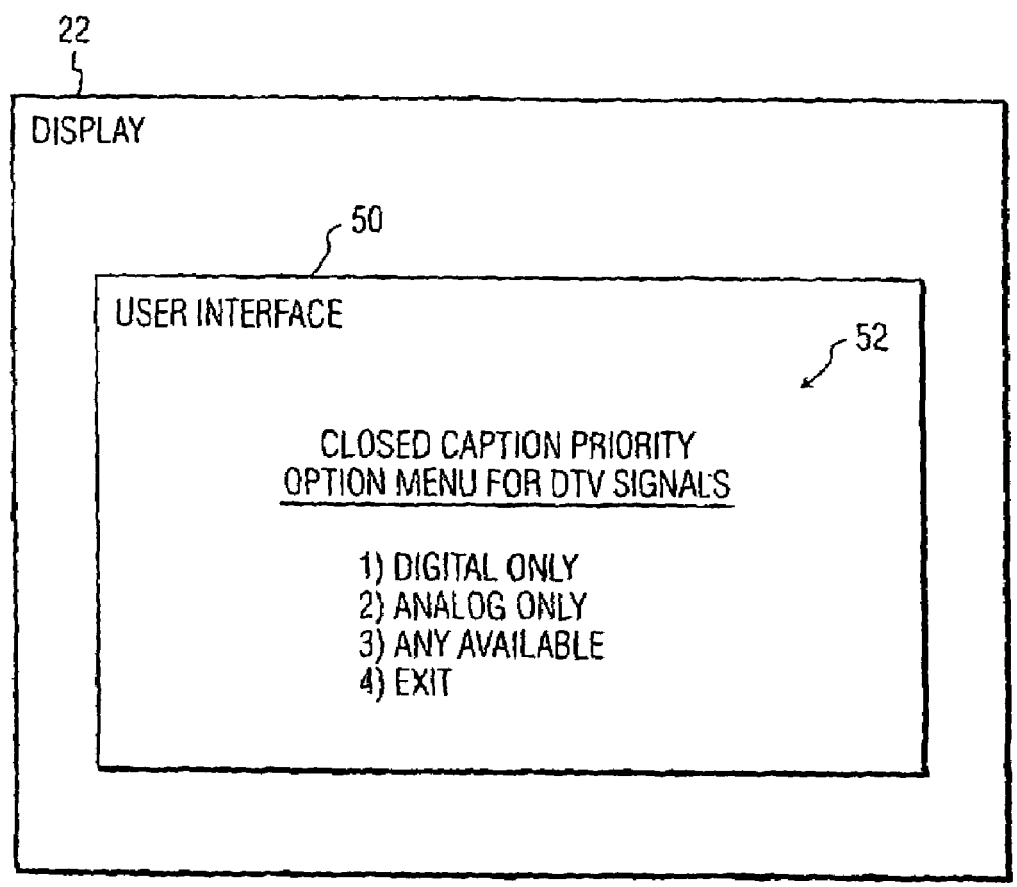
FIG. 2 is a depiction of an exemplary on-screen menu for the selection of closed caption priority processing in accordance with an aspect of the principles of the subject invention.

Referring additionally to FIG. 2, there is depicted the display 22 having an exemplary user interface 50 showing an exemplary closed caption priority option menu 52. The closed caption priority option menu 52 allows the user to select closed caption processing priority for the television signal receiver 20. Selection of a particular closed caption priority causes the television signal receiver 20 to perform as provided herein. The menu 52 is shown having three priority processing options and an "EXIT" selection to return to a main or submenu (not shown).

The first closed caption priority selection, labeled "1) Digital Only" sets the digital television signal receiver 20 into a mode whereby closed captioning is processed and provided to the display 22 only when the closed caption data in the received digital television signal is in the digital standard format. Thus, the closed caption processor 32 provides the received closed caption data from the digital television signal processor 30 to the digital closed caption processor 34. This mode ignores closed captioning if it is in the analog closed caption standard format. Of course, if there is no closed caption data in the digital television signal, no such processing or display thereof is possible.

The second closed caption priority selection, labeled "2) Analog Only" sets the digital television signal receiver 20 into a mode whereby closed captioning is processed and provided to the display 22 only when the closed caption data in the received digital television signal is in the analog standard format. Thus, the closed caption processor 32 provides the received closed caption data from the digital television signal processor 30 to the analog closed caption processor 36. This mode ignores closed captioning if it is in the digital closed caption standard format. Again, of course, if there is no closed caption data in the digital television signal, no such processing or display thereof is possible.

The third closed caption priority mode, labeled "3) Any Available" sets the digital television receiver 20 into a mode whereby closed captioning is processed and provided to the display 22 regardless of whether the closed caption data in the received digital television signal is in the digital standard format or the analog standard format. The closed caption data processor 32 makes the determination (preferably, but not necessarily after monitoring the received signal) of whether the received closed caption data is digital or analog, and then provides the closed caption data to the appropriate processor (i.e. either the digital closed caption data processor 34 or the analog closed caption data processor 36). Again, of course, if there is no closed caption data in the digital television signal, no such processing or display thereof is possible.

The priority of looking to digital first then analog second, i.e., preferentially processing digital auxiliary information first before analog auxiliary information when both types of auxiliary information is being received, is arbitrary and may occur as analog first and digital second. This preferential handling of one type or format of auxiliary information when both types are received can be user selectable, e.g., select that the default or fallback condition is digital format first or select that the fallback is analog format first. Additionally, the labels and order thereof of the menu 52 are arbitrary, the function thereof being relative.

Figure 3:
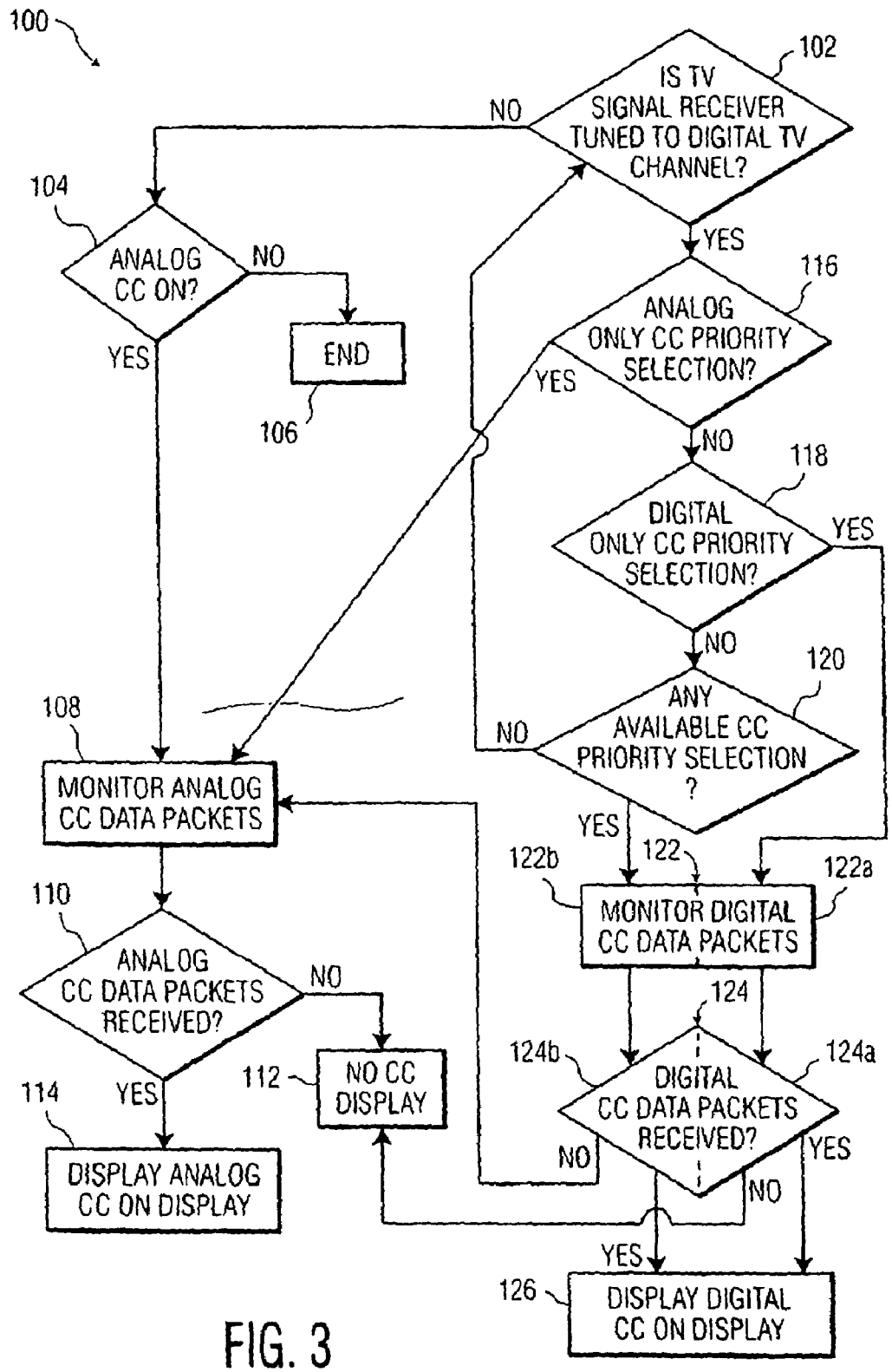
FIG. 3 is a flowchart of an exemplary manner of operation of an aspect of the subject invention in accordance with the principles of the subject invention.

Referring now to FIG. 3, there is depicted a flowchart, generally designated 100, of an exemplary manner of operation of closed caption processing by the television signal receiver 20 in accordance with the present principles. The exemplary manner of closed caption processing provided in flowchart 100 is provided as steps or blocks. In step 102, the digital television signal television receiver 20 determines whether the digital television signal receiver is tuned to a digital television channel. If the television signal receiver also receives and processes analog television signals, then the television signal receiver may not be tuned to a digital channel. In this case, "NO" indicates that a digital television signal has not been tuned and program flow goes to step 104. It is assumed that an analog television signal has been tuned. In step 104, it is determined whether analog closed caption (CC) is on or enabled. If analog closed caption is not enabled (i.e. "NO") then program flow ends, step 106. If analog closed caption is on (i.e. "YES") then program flow proceeds to step 108. In step 108 analog CC data packets are monitored. In step 110, it is determined whether analog CC data packets have been received. If analog CC data packets have not been received (i.e. "NO"), then program flow goes to step 112, where there is no closed caption (CC) display. If, however, it is determined that CC data packets have been received (i.e. "YES"), then program flow goes to step 114. In step 114, the analog closed caption is provided to a display.

If in step 102, it is determined that a digital television channel has been tuned (i.e. "YES"), then program flow proceeds to step 116. Step 116 begins a check of the closed caption priority option that the user has selected via the selection menu 52 (see FIG. 2). Particularly, in step 116, it is determined whether the analog only closed caption priority selection has been made. If the user has selected the "Analog Only" choice (i.e. "YES"), then program flow proceeds to step 108. Program flow from step 108 proceeds as described above. If, however, it is determined in step 116 that "Analog Only" was not the closed caption selection (i.e. "NO"), then program flow proceeds to step 118. Step 118 is a further step in the check of closed caption priority option that the user has selected via the selection menu 52.

If, in step 118, it is determined that digital only closed caption priority has been selected (i.e. "YES"), then program flow proceeds to step 122. Particularly, program flow proceeds to step 122a where monitoring of digital closed caption data packets is performed. Thereafter, in step 124a (of step 124) it is determined whether digital closed caption data packets have been received. If digital closed caption data packets are being received (i.e. "YES"), then program flow proceeds to step 126 where the digital closed caption is shown on the display. If it is determined in step 124a that digital CC data packets are not being received (i.e. "NO"), then program flow proceeds to step 112, where no closed caption is displayed.

If, however, in step 118 it is determined that "Digital Only" has not been selected (i.e. "NO"), then program flow proceeds to step 120. Step 120 is the last of the steps in the check of closed caption priority option that the user has selected via the selection menu 52. Particularly, in step 120 it is determined whether the user has selected any available closed caption priority or digital/analog fallback. A fallback or default mode may provide for preferentially processing one of digital and analog auxiliary information formats, e.g., if both analog and digital auxiliary information formats are received the system will process digital information. Operation during the fallback mode, i.e., whether the system preferentially processes analog or digital information may be user selectable. If the "Any Available" selection is not made (i.e. "NO"), then program flow proceeds back to step 102. If the user has selected "Any Available" from the closed caption priority menu 52 (i.e. "YES"), then program flow proceeds to step 122b of step 122. Particularly, in step 122b digital closed caption data packets are monitored. Note that if the default operating condition in the fallback or "Any Available" mode was made user-selectable, the user could determine whether processing after a "YES" at step 120 would continue at step 122*b* as shown in FIG. 3 (preferential processing of digital format information) or at step 108 (preferential processing of analog format information). Thereafter, in step 124*b* of step 124, it is determined whether digital closed caption data packets are being received. If closed caption data packets are being received (i.e. "YES"), then the digital closed caption is shown on the display, step 126. If, however, digital closed caption data packets are not being received (i.e. "NO"), then there is no closed caption display, step 112.

It should be appreciated that after execution through the flowchart 100, particularly via steps 112, 114 or 126, program flow will then return back to step 102 for continual monitoring of the tuned television signal. It should be further appreciated that the flowchart 100 described above and depicted in FIG. 3 provides a complete manner of exemplary operation of the digital television signal receiver 20 as described herein. Every step, however, is not necessary for implementation of the subject invention. The subject invention may be implemented utilizing less steps than all of the steps of the flowchart 100. This may be reflected in the claims. Moreover, more or less steps in alternative embodiments of the procedure 100 may implement the subject invention in accordance with the principles recited herein. As well, subsets of the above procedure 100 may implement the principles of the subject invention rather than the whole procedure. Variations are also contemplated.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claim is:

1. A method of processing a digital television signal comprising the steps of:
   receiving a digital television signal having closed caption data;
   determining the format of the closed caption data;
   selecting a priority for processing the format of the closed caption data;
   processing the closed caption data in accordance with the format of the closed caption data and with the selected priority for processing the format of the closed caption data; and
   providing a resulting television signal from the received digital television signal and the processed closed caption data that is suitable to show the processed closed caption data on a display.

2. The method of claim 1 wherein the step of processing the closed caption data includes:
   processing the digital closed caption data according to EIA-708 digital closed caption data standard; or
   processing the analog closed caption data according to EIA-608 analog closed caption data standard.

3. The method of claim 1, wherein the step of processing the closed caption data includes:
   monitoring the digital television signal having closed caption data for digital closed caption data packets in conformance with the digital closed caption standard format and for analog closed caption data packets in conformance with the analog closed caption standard format.

4. The method of claim 1, wherein the step of receiving a digital television signal having closed caption data comprises tuning to a digital television signal having closed caption data.

5. A television signal receiver comprising:
   a digital tuner operable to receive a digital television signal containing closed caption data;
   a digital television signal processor connected to said digital tuner and operable to obtain a video signal and extract the closed caption data from the digital television signal; and
   a closed caption data processor connected to said digital television signal processor and operable to:
   determine whether the extracted closed caption data is formatted according to a digital closed caption data standard or according to an analog closed caption data standard,
   select a priority for processing the format of the closed caption data,
   process the extracted closed caption data in accordance with the format of the closed caption data and with the selected priority for processing the format of the closed caption data and,
   provide a resulting closed caption data signal suitable for showing the closed caption data on a display.

6. The television signal receiver of claim 5, wherein said closed caption data processor is operable to process the digital closed caption data according to the EIA-708 digital closed caption data standard and to process the analog closed caption data according to the EIA-608 analog closed caption data standard.

7. The television signal receiver of claim 5, further comprising:
   a buffer connected to the closed caption processor and the digital television signal processor and operable to combine the resulting closed caption data signal from the closed caption data processor with the video signal from the digital television signal processor for showing the combined television signal on the display.

8. The television signal receiver of claim 5, wherein the closed caption data processor is operable to continuously monitor the tuned digital television signal for determining whether the closed caption data is formatted according to a digital closed caption data standard or according to an analog closed caption data standard.

9. A television signal receiver comprising:
   means for receiving a digital television signal containing closed caption data;
   means, connected to said means for receiving, for processing the received digital television signal to obtain a video signal and extract the closed caption data; and
   means, connected to said means for processing, for
   determining whether the extracted closed caption data is formatted according to a digital closed caption data standard or according to an analog closed caption data standard,
   selecting a priority for processing the format of the closed caption data,
   processing the extracted closed caption data in accordance with the format of the closed caption data, and with the selected priority for processing the format of the closed caption data, and
   providing a resulting closed caption data signal suitable for showing the closed caption data on a display.

10. The television signal receiver of claim 9, wherein said means, connected to said means for processing, further includes:

means for processing the digital closed caption data according to the EIA-708 digital closed caption data standard, and means for processing the analog closed caption data according to the EIA-608 analog closed caption data standard.

11. The television signal receiver of claim 9, further comprising:

means, connected to the closed caption processing means and the means for processing the digital television signal, for combining the resulting closed caption data signal with the video signal for showing the combined television signal on the display.

12. The television signal receiver of claim 9, wherein the closed caption processing means is further operable to continuously monitor the tuned digital television signal for determining whether the closed caption data is formatted according to a digital closed caption data standard or according to an analog closed caption data standard.

13. A method of processing auxiliary information included in a television signal comprising the steps of:

receiving a digital television signal including auxiliary information;

determining a format of the auxiliary information;

selecting a priority for processing the format of the auxiliary information; and processing the auxiliary information in accordance with a format of the auxiliary information and with a priority for processing the format of the auxiliary information.

14. A method of processing auxiliary information included in a television signal comprising the steps of:

receiving a digital television signal including auxiliary information;

determining the format of the auxiliary information;

selecting a priority for processing the format of the auxiliary information; and processing the auxiliary information in accordance with a format of the auxiliary information and with a priority for processing the format of the auxiliary information.

15. The method of claim 14 wherein the step of processing the auxiliary information occurs in response to determining that the auxiliary information comprises a digital auxiliary information format and selecting a priority for enabling processing of auxiliary information in a digital auxiliary information format and for disabling processing of auxiliary information in an analog auxiliary information format.

16. The method of claim 14 wherein the selected priority comprises one of: a) a digital only priority for enabling processing of the auxiliary information only in response to determining that the format of the auxiliary information corresponds to a digital auxiliary information format, b) an analog only priority for enabling processing of the auxiliary information only in response to determining that the format of the auxiliary information corresponds to an analog auxiliary information format, and c) an any available format for enabling the processing of the auxiliary information in either the digital or analog auxiliary information formats.

17. The method of claim 14 wherein the selected priority comprises processing auxiliary information in a digital auxiliary information format in response to determining that the received auxiliary information includes auxiliary information in a digital auxiliary information format and auxiliary information in an analog auxiliary information format.

* * * * *

UNITED STATES PATENT AND TRADEMARK OFFICE
CERTIFICATE OF CORRECTION

PATENT NO. : 7,663,696 B2  Page 1 of 1
APPLICATION NO. : 10/581152
DATED : February 16, 2010
INVENTOR(S) : Modi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this

Thirtieth Day of November, 2010

David J. Kappos
*Director of the United States Patent and Trademark Office*